United States Patent
Matus

(10) Patent No.: US 7,034,244 B2
(45) Date of Patent: Apr. 25, 2006

(54) METHOD AND APPARATUS OF COORDINATING OPERATIONAL FEEDBACK IN A PLASMA CUTTER

(75) Inventor: Tim A. Matus, San Antonio, TX (US)

(73) Assignee: Illinois Tool Works Inc., Glenview, IL (US)

( * ) Notice: Subject to any disclaimer, the term of this patent is extended or adjusted under 35 U.S.C. 154(b) by 13 days.

(21) Appl. No.: 10/605,038

(22) Filed: Sep. 3, 2003

(65) Prior Publication Data

US 2005/0045599 A1   Mar. 3, 2005

(51) Int. Cl.
*B23K 10/00* (2006.01)

(52) U.S. Cl. .......................... 219/121.51; 219/121.57; 219/121.59

(58) Field of Classification Search ........... 219/121.54, 219/121.57, 121.39, 121.38, 121.44, 121.48, 219/74, 75, 137.63, 121.45, 121.55, 121.56, 219/137.9, 124.02, 124.03, 124.34, 130.1
See application file for complete search history.

(56) References Cited

U.S. PATENT DOCUMENTS

| | | | | |
|---|---|---|---|---|
| 4,328,049 A | * | 5/1982 | Richardson | 148/195 |
| 4,390,954 A | * | 6/1983 | Manning | 700/212 |
| 5,148,000 A | * | 9/1992 | Tews | 219/125.11 |
| 5,866,869 A | | 2/1999 | Schneider et al. | |
| 5,912,471 A | * | 6/1999 | Schutz | 250/559.4 |
| 6,008,464 A | * | 12/1999 | Donnart et al. | 219/121.54 |
| 6,066,835 A | * | 5/2000 | Hanks | 219/137.9 |
| 6,194,682 B1 | * | 2/2001 | Schneider et al. | 219/121.55 |
| 6,326,581 B1 | | 12/2001 | Laimer et al. | |
| 6,359,251 B1 | * | 3/2002 | Picard et al. | 219/121.57 |
| 6,570,132 B1 | | 5/2003 | Brunner et al. | |

OTHER PUBLICATIONS

Hackl, Heinrich, Digitally Controlled GMA Power Sources, pp. 1-7 http://www.fronius.com/worldwide/usa/products/paper_digitally_controlled_power_sources_gb.pdf.

* cited by examiner

*Primary Examiner*—Mark Paschall
(74) *Attorney, Agent, or Firm*—Ziolkowski Patent Solutions Group, SC

(57) ABSTRACT

The present invention is directed to a system and method for improved operational feedback from a plasma torch to a plasma-cutting power source. A plasma cutter includes a plasma cutting power source, a plasma torch in communication with the plasma cutting power source, and a serialization circuit disposed within the plasma torch to control transmission of multiple feedback signals from the plasma torch to the plasma cutting power source. The serialization circuit receives the multiple feedback signals and places the feedback in a queue, such that the multiple feedback signals are sent from the queue to a processing unit in the power source via a single communications link.

19 Claims, 2 Drawing Sheets

METHOD AND APPARATUS OF COORDINATING OPERATIONAL FEEDBACK IN A PLASMA CUTTER

BACKGROUND OF INVENTION

The present invention relates generally to plasma cutting systems and, more particularly, to a method and apparatus for coordinating operational feedback in a plasma cutter. Specifically, the present invention provides a system and method of serializing feedback from a plasma-cutting torch to a plasma-cutting power source.

Plasma cutting is a process in which an electric arc is used to cut a workpiece. Plasma cutters typically include a power source, an air supply, and a torch. The torch or plasma torch is used to create and maintain the arc and plasma that perform the cutting. The plasma cutting power source receives an input voltage from a transmission power line or generator and provides an output voltage to a pair of output terminals, one of which is connected to an electrode and the other of which is connected to the workpiece.

The air supply is used with most plasma cutters to help start the arc, provide the plasma gas to the torch, and cool the torch. A movable or fixed electrode serves as a cathode and a fixed nozzle serves an anode. The air supply moves the electrode and as the electrode moves away from the nozzle, it opens the nozzle, and a plasma jet is created. The plasma jet causes the arc to transfer to the work piece, and thus initiates the cutting process. In other plasma cutting systems, a high frequency starter is used to initiate the cutting process.

The power source is supplied with operational feedback from the torch and a processor, disposed in the power source, interprets the data and controls the operation of the plasma cutter. For example, the processor of the power source is provided with feedback about the position of the torch trigger and whether all necessary torch components are securely in place at the torch. From the feedback, the processor determines whether to initiate cutting, pause cutting, discontinue cutting, or augment the operation of the plasma cutter during cutting.

This feedback is typically provided via dedicated communications lines. Therefore, for each form of feedback that is sent from the torch to the power source, an individual communications line is connected between the power supply and cutting torch. This parallel feedback system presents numerous drawbacks.

First, plasma cutting is a high voltage process and therefore the user must be mindful that precautionary measures must be taken to avoid improper operation. As such, it is necessary to determine whether specific conditions are present prior to the initiation of cutting. For example, before the power source responds to a request for operational power at the torch, the processor of the power source typically determines whether a retaining cup, fastened at the torch tip and securing the electrode, is in place. This ensures that the torch is in operating condition prior to cutting. However, while it is common to provide a cup-attached signal before permitting operational cutting, the number of feedbacks is limited by the parallel feedback system. Specifically, since the feedback must be sent from the torch to the power source, the feedback must travel over a control cord connecting the torch and power source. To control manufacturing costs and maintain portability of the plasma cutter, it is necessary to limit the number of parallel communications links between the torch and the power source. As such, though additional sensors could be included to provide additional feedback regarding the plasma cutting process, the number of sensors to provide feedback is limited by the number of parallel communications links.

Second, plasma cutters are regularly subjected to harsh operating conditions associated with the operating environment in which they are placed and the nature of plasma cutting. For example, plasma cutters are commonly operated within large manufacturing environments or at an in-field site. As a result of these typically callous operating environments, it is possible for one of the communications lines to fail as a result of repeated percussions. Furthermore, it is not uncommon for the plasma torch to be regularly disconnected from the power source for cleaning and maintenance. This repeated disconnection and reconnection can be particularly damaging to the electrical connections of the parallel feedback system. In either case, if the parallel feedback system fails, the plasma cutter must be removed from service and repaired or otherwise serviced.

It would therefore be desirable to design a plasma cutting system that is capable of providing multiple feedback signals to the power source. Specifically, it would be desirable to design a plasma cutting system having a more robust feedback communications system.

BRIEF DESCRIPTION OF INVENTION

The present invention is directed to a system and method of coordinating operational feedback in a plasma cutter that overcomes the aforementioned drawbacks. Specifically, the present invention provides a system and method of serializing feedback from a plasma-cutting torch to a plasma-cutting power source. The invention includes a plasma cutting power source, a plasma torch in communication with the plasma cutting power source, and a serialization circuit disposed within the plasma torch to control transmission of multiple feedback signals from the plasma torch to the plasma cutting power source. The serialization circuit receives the multiple feedback signals and places the feedback in a queue, such that the multiple feedback signals are sent from the queue to a processing unit in the power source via a single communications link.

Therefore, in accordance with one aspect of the present invention, a plasma cutting system is disclosed including a plasma cutting power source, a plasma torch operationally connected to the plasma cutting power source, and a serialization circuit disposed within the plasma torch. The serialization circuit is configured to control transmission of multiple feedback signals from the plasma torch to the plasma cutting power source.

In accordance with another aspect of the present invention, a method for providing feedback from a plasma torch to a remote power source is disclosed including receiving feedback from a plurality of sensors disposed in the plasma torch. The method also includes arranging the feedback in a queue and sending the feedback to a remote power source in an order the feedback is arranged in the queue.

In accordance with yet another aspect of the present invention, a plasma torch assembly is disclosed including a torch body enclosing a plasma-cutting electrode and a plurality of sensors. The plurality of sensors is configured to provide feedback regarding at least operational conditions of a plasma torch. A serializer is disposed within the torch body to receive feedback from the plurality of sensors and configured to transmit the feedback to a remote processing unit via a single communications link.

Various other features, objects and advantages of the present invention will be made apparent from the following detailed description and the drawings.

BRIEF DESCRIPTION OF DRAWINGS

The drawings illustrate one preferred embodiment presently contemplated for carrying out the invention.

In the drawings.

DETAILED DESCRIPTION

The present invention is directed to an operational feedback system of a plasma cutter. The serial communications feedback system allows the power source, where operational control is managed, to be supplied with diversified feedback regarding the plasma cutting process while reducing manufacturing costs and the potential for a communications breakdown due to operational wear.

Figure 1:
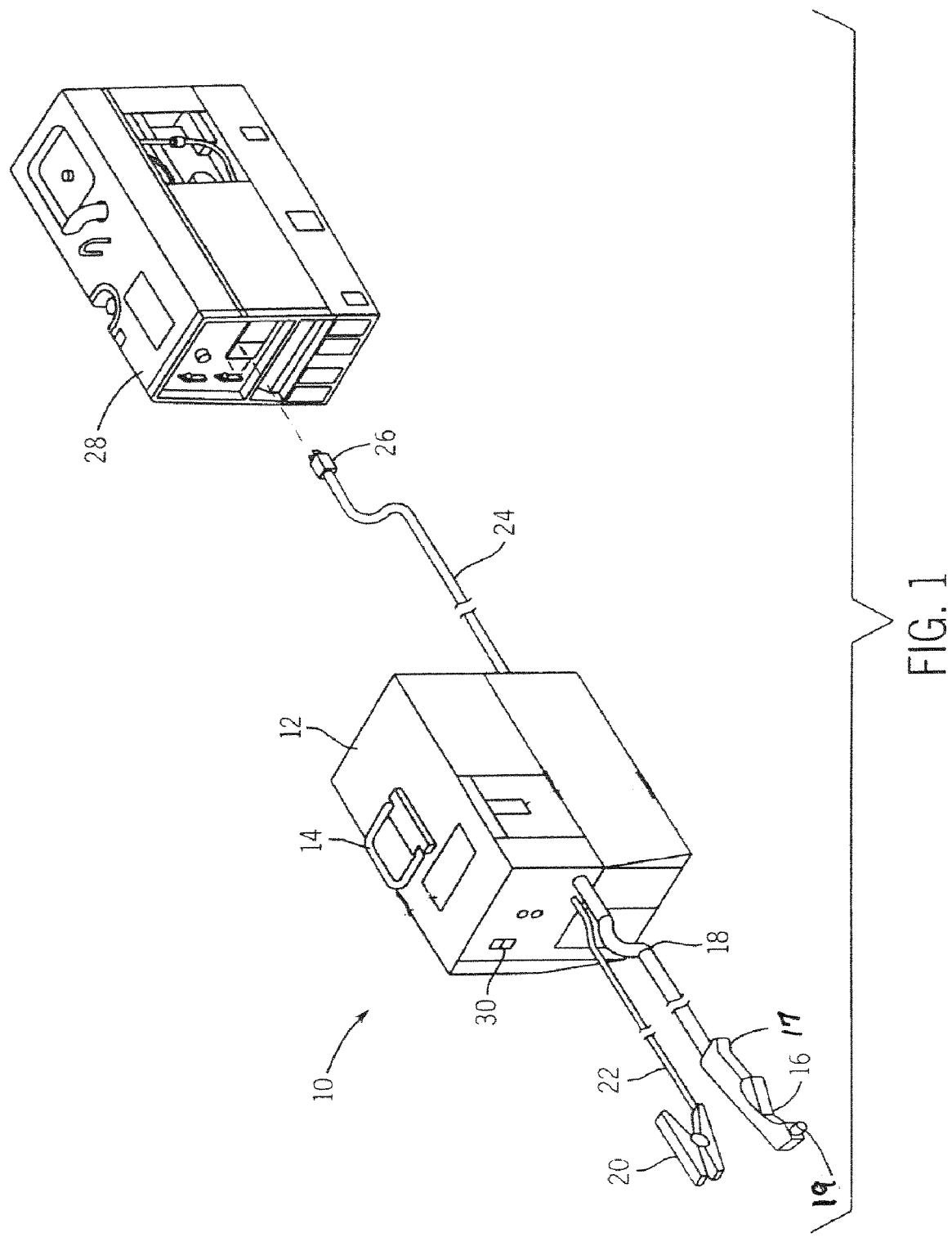
FIG. 1 is a perspective view of a plasma cutting system incorporating the present invention.

Referring to FIG. 1, a plasma cutting system 10 is shown. The plasma cutting system is a high voltage system with maximum open circuit output voltages ranging from approximately 230 Volts Direct Current (VDC) to over 300 VDC. The plasma cutting system 10 includes a power source 12 to condition raw power and regulate/control the cutting process. Specifically, the power source includes a processor that, as will be described, receives operational feedback and controls the plasma cutting system 10 accordingly. Power source 12 includes a lifting means, such as a handle 14 which effectuates transportation from one site to another. Connected to the power source 12 is a torch 16 via cord 18. The torch 16 is defined at least by a torch body or housing 17 enclosing a plasma-cutting electrode 19. The cord 18 provides the torch 16 with power and serves as a communications link between the torch 16 and power source 12. The cord 18 contains two conductive paths. One conductive communications link or conductive path is dedicated to the transfer of power to energize the plasma-cutting electrode 19 and the other conductive path is dedicated to the transfer of feedback to the power source 12. In an alternative embodiment, the cord 18 contains one conductive path between the torch 16 and power source 12 to transfer both operational feedback and power. Specifically, a single conductive path is contained within the cord 18 that simultaneously transfers power and feedback from the plasma torch regarding the plasma cutting process.

Also connected to power source 12 is a work clamp 20 which is designed to hold a workpiece (not shown) to be cut. Connecting work clamp 20 to the power source 12 is a cable 22 designed to provide a return path for the cutting current from the torch through the workpiece and the work clamp 20. Extending from a rear portion of power source 12 is power cable 24 having plug 26 for connecting the power source 12 to a portable power supply 28 or a transmission power receptacle (not shown). Power source 12 further includes an ON/OFF switch 30.

To effectuate cutting of a workpiece, torch 16 is placed in close proximity to a workpiece connected to clamp 20. A user may then activate a trigger lock (not shown), in response to which a feedback signal is sent from a trigger sensor disposed within the torch 16 and connected to the trigger lock in the torch 16. The signal is received by a serializing circuit disposed within the torch 16 and placed in a queue. After passing through a queue, the trigger lock signal is sent to the power source 12, via the cord 18, where a processing unit, disposed in the power source 12, processes the feedback.

After the trigger lock is activated, the user may then press the trigger switch (not shown). Upon pressing the trigger switch, another feedback signal is sent from the trigger sensor disposed within the torch 16. The trigger switch feedback is again sent to the serializing circuit within trigger 16 where it is placed in a queue and, after passing through the queue, the signal is sent to the processing unit of the power source 12.

Once the trigger switch signal is processed, the power source processing unit causes power to be sent to the torch 16 to initiate a pilot arc. Shortly thereafter, a cutting arc is generated and the user may then slowly move the torch across the workpiece to cut the workpiece. The user may adjust the torch speed to reduce spark splatter and provide a more-penetrating cut.

Additional sensors are included within the torch 16 to send additional feedback, specific to plasma cutting, back to the processing unit of power source 12. In particular, sensors to monitor air pressure, tip and electrode type, safety trigger, and consumable life are included. Other additional sensors to provide feedback regarding a plurality of plasma cutting operations may also be included. For example, sensors may be constructed and disposed within the torch 16 to send feedback regarding power source activation, cup position, shorted component, torch temperature, trigger position, operation amperage, current transfer, and voltage drop, as well as any other operational conditions capable of being monitored.

The wide range of feedback transmission across a single communication link is made possible by the serialization circuit. Specifically, the serialization circuit allows signals from multiple sensors to be sent from the torch 16 to the power source 12 because, since the communications are serialized, only one communications link is necessary. That is, from each sensor, a feedback signal is generated and sent to the serializing circuit where the feedback signals are placed in a queue before being transferred along the cord 18 to the processing unit in the power source 12. Therefore, even though multiple feedback signals are sent from the torch 16 to the power source 12, the cord 18 may be smaller than traditional cords housing parallel communications links.

In one embodiment the communications link also facilitates the transfer of power from the power source 12 to the torch 16. Accordingly, the communications link serves dual purposes and a single conductive means is included within the cord 18 to transmit the feedback to the power source and the power to the torch 16.

Figure 2:
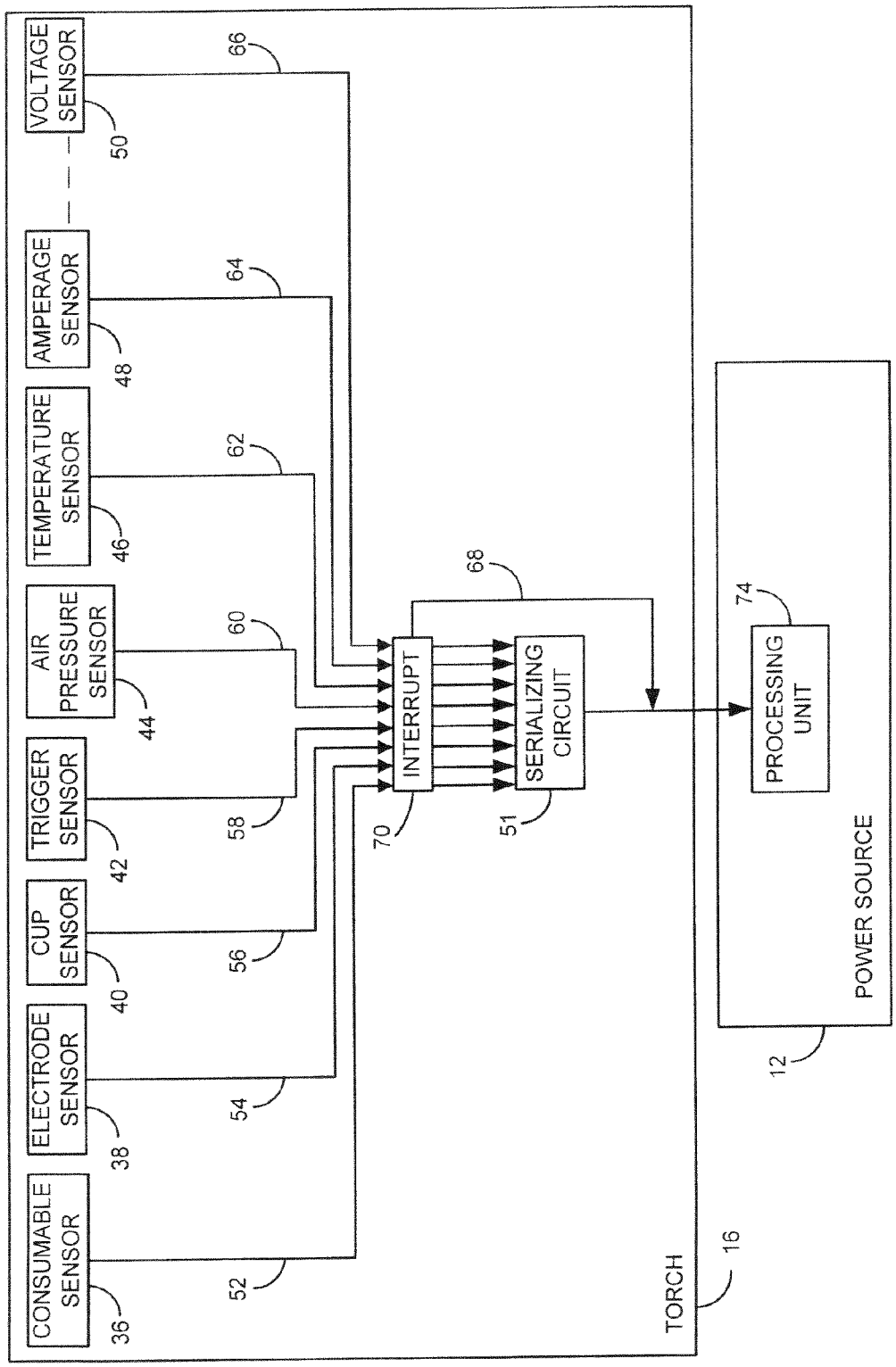
FIG. 2 is a schematic representation of a feedback control system operable with the plasma cutting system shown in FIG. 1.

Referring now to FIG. 2, a schematic representation of the feedback control system in accordance with the present invention is shown. A plurality of feedback sensors is disposed within plasma torch 16 including a consumable sensor 36, an electrode sensor 38, a cup sensor 40, a trigger sensor 42, an air pressure sensor 44, a temperature sensor 46, an amperage sensor 48, and a voltage sensor 50. However, this list of sensors is exemplary and is not exhaustive of those contemplated or applicable. Each sensor 35–50 is connected to transmit feedback sensory information through a serializing circuit 51, which is also disposed within the plasma torch 16. The serializing circuit 51 receives feedback from the sensors 38–50 across signal paths 52–66 and holds the feedback in a queue in the order that the feedback is received thereby allowing the feedback to pass in serial form to power source 12 for processing and/or application. It is contemplated that the serializing circuit may consist of analog components, digital components, or a combination thereof. As such, the feedback signals may be communicated as analog signals or discrete digital signals. After passing through the queue, the feedback is sent from the plasma torch 16 to the power source 12 where a processing unit 74 receives and interprets the feedback.

In accordance with one embodiment, an interrupt loop 68 for the serializing circuit includes an interrupt 70. The interrupt 70 allows feedback that is vital to the operation of the plasma torch 16, such as problematic operational feedback, to bypass the queue of the serializing circuit 51 and be sent directly to the power source 12. As such, feedback that is vital to the operation of the plasma torch 16 is not delayed by the serialization circuit 51. For example, the interrupt 70 monitors the feedback across signal paths 52–66 for data associated with a potentially problematic operating condition and if feedback indicating the problematic condition is detected, the feedback is redirected to interrupt loop 68 to bypass the serializing circuit and transmitted to the processing unit of the power source 12. As such, the processing unit 74 is provided with necessary feedback to augment the operation of the plasma cutter immediately before a problematic operating condition is permitted to persist. The indication of an unsafe condition needing immediate action may vary and be associated with one or more of the types of feedback received. In one embodiment, one or more feedback signals are monitored and if the feedback includes a value of operation that is outside an acceptable range of values, the interrupt 70 automatically redirects the operational feedback to the power source 12 bypassing the serializing circuit 51. One skilled in the arts will appreciate that other methods of determining an immediate action item may be implemented and are contemplated.

Therefore, in accordance with one embodiment of the present invention, a plasma cutting system includes a plasma cutting power source, a plasma torch operationally connect to the plasma cutting power source, and a serialization circuit disposed within the plasma torch to control transmission of multiple feedback signals from the plasma torch to the plasma cutting power source.

In accordance with another aspect of the present invention, a method for providing feedback from a plasma torch to a remote power source includes receiving feedback from a plurality of sensors disposed in the plasma torch. The method also includes arranging the feedback in a queue and sending the feedback to a remote power source in an order the feedback is arranged in the queue.

In accordance with yet another aspect of the present invention, a plasma torch assembly includes a torch body enclosing a plasma-cutting electrode and a plurality of sensors. The plurality of sensors is configured to provide feedback regarding at least operational conditions of a plasma torch. A serializer is disposed within the torch body to receive feedback from the plurality of sensors and configured to transmit the feedback to a remote processing unit via a single communications link.

The present invention has been described in terms of the preferred embodiment, and it is recognized that equivalents, alternatives, and modifications, aside from those expressly stated, are possible and within the scope of the appending claims.

What is claimed is:

1. A plasma cutting system comprising:
   a plasma cutting power source;
   a plasma torch operationally connected to the plasma cutting power source; and
   a serialization circuit disposed within the plasma torch to control transmission of multiple feedback signals between the plasma torch and the plasma cutting power source; and
   an interrupt to transmit potentially problematic operating condition feedback to the power source bypassing the serialization circuit.

2. The plasma cutting system of claim 1 further comprising a plurality of sensors configured to provide feedback signals to the plasma cutting power source.

3. The plasma cutting system of claim 2 wherein the serialization circuit is configured to serialize feedback from the plurality of sensors to the plasma cutting power source.

4. The plasma cutting system of claim 2 wherein the plurality of sensors includes at least two of a power source activation indicator, an electrode type indicator, a tip type indicator, a cup position indicator, a consumable indicator, a shorted component indicator, an air pressure indicator, a temperature indicator, a trigger position indicator, a trigger safety indicator, an operation amperage indicator, a current transfer indicator, and a voltage drop indicator.

5. The plasma cutting system of claim 1 further comprising a single communications link for transmission of multiple feedback signals to the plasma cutting power source.

6. The plasma culling system of claim 5 wherein the single communications link is configured to translate power from the plasma cutting power source to the plasma torch.

7. The plasma cutting system of claim 1 wherein the potentially problematic operating condition feedback includes one of an over-temperature signal, a trigger release signal, and a consumable condition signal.

8. The plasma cutting system of claim 1 wherein the serialization circuit includes at least one of an analog serializing circuit and a digital serializing circuit.

9. The plasma cutting system of claim 1 wherein the plasma torch is configured to operate with a maximum open circuit output voltage of greater than 220 volts DC.

10. A method of providing feedback from a plasma torch to a remote power source, the method comprising:
    receiving feedback from a plurality of sensors disposed in a plasma torch;
    arranging the feedback in a queue;
    sending the feedback to a remote power source in an order the feedback is arranged in the queue; and
    interrupting the queue when the feedback received is a safety condition feedback signal.

11. The method of claim 10 further comprising transmitting the feedback to the remote power source via a single communications link.

12. The method of claim 11 further comprising transmitting power to the plasma torch across the single communications link.

13. A plasma torch assembly comprising:
    a torch body enclosing a plasma-cutting electrode;
    a plurality of sensors disposed within the torch body and configured to provide feedback regarding at least operational conditions of a plasma cutting process;
    a serializer disposed within the torch body to receive feedback from the plurality of sensors and configured to transmit the feedback to a remote processing unit via a single communications link: and
    an interrupt to transmit a potential problematic operating condition to the remote processing unit.

14. The plasma torch assembly of claim 13 wherein the plurality of sensors includes at least two of a power source activation indicator, a cup position indicator, a consumable indicator, a shorted component indicator, an air pressure indicator, a temperature indicator, a trigger position indicator, an operation amperage indicator, a current transfer indicator, and a voltage drop indicator.

15. The plasma torch assembly of claim 13 wherein the serializer includes a serialization circuit configured to send the feedback as discrete feedback signals to the remote processing unit.

16. The plasma torch assembly of claim 13 wherein the single communications link is a power-supply cable.

17. A method of manufacturing a plasma cutting torch comprising:
constructing a housing;
enclosing a plasma-cutting electrode within the housing;
disposing a plurality of sensors within the housing to provide operational feedback regarding operational conditions of a plasma-cutting process;
connecting the plurality of sensors to a serializing circuit such that feedback from the sensors is queued by the serializing circuit before being sent to a plasma-cutting power source; and
disposing an interrupt of the serializing circuit within the housing to bypass the serialization circuit and to transmit feedback indicative a potentially problematic operating condition to the plasma-cutting power source.

18. The method of claim 17 further comprising disposing the serializing circuit within the housing.

19. The method of claim 17 further comprising manufacturing the housing, plasma-cutting electrode, plurality of sensors, and serializing circuit to operate with a maximum open circuit output voltage of greater than 220 volts DC.

* * * * *

UNITED STATES PATENT AND TRADEMARK OFFICE
CERTIFICATE OF CORRECTION

PATENT NO. : 7,034,244 B2
APPLICATION NO. : 10/605038
DATED : April 25, 2006
INVENTOR(S) : Matus It is certified that error appears in the above-identified patent and that said Letters Patent is hereby corrected as shown below:

Col. 6, line 27 (Claim 6), delete "culling" and substitute therefore -- cutting --;

Col. 8, line 7 (Claim 17), delete "indicative" and substitute therefore -- indicating --.

Signed and Sealed this

Twenty-fifth Day of July, 2006

JON W. DUDAS
*Director of the United States Patent and Trademark Office*